United States Patent
Treppmann et al.

(10) Patent No.: US 9,812,865 B2
(45) Date of Patent: Nov. 7, 2017

(54) MOBILE ENERGY STORAGE MODULE

(71) Applicant: ENRICHMENT TECHNOLOGY COMPANY LDT., Jülich (DE)

(72) Inventors: Ing. Christoph Treppmann, Aachen (DE); Ing. Rainer vor dem Esche, Heinsberg (DE); Thomas Bäumer, Hückelhoven (DE); Dipl. Ing. Michael Sonnen, Duisburg (DE); Christoph Schäfer, Aachen (DE); Christian Middendorf, Aachen (DE)

(73) Assignee: Enrichment Technology Company Ltd. (DE)

( * ) Notice: Subject to any disclaimer, the term of this patent is extended or adjusted under 35 U.S.C. 154(b) by 185 days.

(21) Appl. No.: 14/430,503

(22) PCT Filed: Sep. 10, 2013

(86) PCT No.: PCT/EP2013/068725
§ 371 (c)(1),
(2) Date: Mar. 23, 2015

(87) PCT Pub. No.: WO2014/048728
PCT Pub. Date: Apr. 3, 2014

(65) Prior Publication Data
US 2015/0318702 A1 Nov. 5, 2015

(30) Foreign Application Priority Data

Sep. 28, 2012 (EP) .................................... 12186488

(51) Int. Cl.
*H02J 3/30* (2006.01)
(52) U.S. Cl.
CPC ................. *H02J 3/30* (2013.01); *Y02E 60/16* (2013.01); *Y10T 307/50* (2015.04)

(58) Field of Classification Search
CPC .......................................................... H02J 3/30
(Continued)

(56) References Cited

U.S. PATENT DOCUMENTS

| 5,761,854 A * | 6/1998 | Johnson | .................... B60P 3/34 135/116 |
| 8,008,804 B2 * | 8/2011 | Capp | ........................ H02J 3/30 307/44 |

(Continued)

FOREIGN PATENT DOCUMENTS

| DE | 29 18 834 | 11/1980 |
| DE | 42 11 891 A1 | 10/1993 |

(Continued)

OTHER PUBLICATIONS

International Search Report for corresponding PCT/EP2013/068725, dated Jul. 31, 2014 by C. Gatzert of the EPO.

(Continued)

*Primary Examiner* — Rexford Barnie
*Assistant Examiner* — Joseph Inge
(74) *Attorney, Agent, or Firm* — Tarolli, Sundheim, Covell & Tummino LLP

(57) ABSTRACT

A mobile energy storage module is provided having a high energy storage capacity and output. An energy storage system having such energy storage modules and to a method for adjusting the energy storage system to the demands in the power supply grids is also disclosed. To achieve this, the mobile energy storage module comprises an enclosing module housing having at least one power connection interface and at least one data interface, and additionally comprises a flywheel module having a plurality of flywheel energy storage units, a vacuum module for generating a minimum vacuum required for operating the flywheel module, a cooling module for removing at least internal thermal loads (Continued)

during operation of the flywheel module, and a module control system that is configured to appropriately control the modules in the module housing.

16 Claims, 5 Drawing Sheets

(58) Field of Classification Search
USPC .......................................................... 307/43
See application file for complete search history.

(56) References Cited

U.S. PATENT DOCUMENTS

| | | | |
|---|---|---|---|
| 2004/0263116 A1* | 12/2004 | Doruk | ..................... F01K 13/00 320/107 |
| 2011/0298293 A1* | 12/2011 | Veltri | .................... F16C 39/063 307/84 |

FOREIGN PATENT DOCUMENTS

| | | |
|---|---|---|
| EP | 2 495 800 A1 | 9/2012 |
| JP | H5-87050 A | 4/1993 |
| JP | 2007-503191 A | 2/2007 |
| WO | WO 03/049249 A | 6/2003 |
| WO | 2011/153612 A2 | 12/2011 |

OTHER PUBLICATIONS

Flynn, et al.: "*Saving Energy Using Flywheels*"; IEEE Industry Applications Magazine, IEEE Service Center, Piscataway, NJ, US; vol. 14, No. 6, Nov. 1, 2008, pp. 69-76; XP011234318; ISSN: 1077-2618, DOI: 10.1109/MIAS.2008.929351 (whole document).
Japanese Office Action for Application No. 2015-533520 dated Jun. 13, 2017.

* cited by examiner

MOBILE ENERGY STORAGE MODULE

FIELD OF THE INVENTION

The invention relates to a mobile energy storage module having a high energy storage capacity and output, to an energy storage system having such energy storage module, and to a method for providing energy for control and system tasks in power supply grids in a variable manner.

BACKGROUND OF THE INVENTION

At present, transmission networks and their interconnection in wide area synchronous grids ensure the supply with electricity over large areas. With an increasing volatility of the power supply grid, the demand for decentralized energy storage systems to solve local tasks in the power supply grid is also increasing, for example, local utilization of locally generated energy or the improvement of local electricity supplies from renewable energies along a timely prediction. Especially decentralized energy generation, for example, by means of a plurality of wind turbines and solar power stations that are distributed over areas, increasingly results in voltage shifts in the power supply grids that are difficult to control. Since only a part of the power supply grids have sufficient transport capacity, temporary local electricity surpluses and demands for electricity can no longer be transported by the power supply grid. It is therefore desirable to have decentralized energy storage systems that can be integrated into the existing power supply grids in a flexible manner depending on the particular demand, in order to improve the grid quality and security of energy supplies and to ensure electricity transport capabilities.

Due to the extension of the power supply grid, bottlenecks in the transport of electricity can be eliminated over the long term. However, an extension covering a large area is cost-intensive and requires long approval and construction phases. The support of a uniform distribution of electricity, however, requires storage solutions that can be immediately used at any location in a variable manner and quickly moved to other locations if necessary but, nevertheless, have an energy storage capacity and output high enough for grid stabilization.

Pumped storage power stations are energy storage systems that, although their capacity allows them to store large amounts of energy and be available as a minute reserve for power supply grids, are still geographically bound to their location and cannot be set up at any place and transferred when necessary. That is why these energy storage systems do not solve the electricity distribution problem because the energy of the pumped storage power stations must, if necessary, even be transported over very long distances and via power lines possibly having not enough capacity. Moreover, the erection of a pumped storage power station is complex, time-consuming and cost-intensive. Moreover, pumped storage power stations are designed for full-load operation and are therefore not adapted to improve the grid quality in small local power supply systems.

Battery storage devices represent an energy storage type that can, in some cases, be moved to other locations and therefore be used in a variable manner. Battery storage devices, however, are not adapted to be resistant to load changes during operation and quickly degrade because of temperature effects, system failures and operating errors. What is more, battery storage devices require highly intensive maintenance. Due to their high fire and chemical risks, battery storage devices additionally present an environmental and water hazard and are highly complex in terms of protection and security. Today's mechanical energy storage systems having a high capacity, such as flywheel energy storage systems, are presently set up in a stationary manner for mechanical reasons and only solve local grid problems. To date, such systems have not been mobile and can, therefore, neither be subsequently modified quickly in their capacity.

SUMMARY OF THE INVENTION

It is therefore an object of the invention to provide an energy storage system that can be quickly deployed at any location desired in a variable manner and with small effort and that has a sufficiently large energy storage capacity and output for buffer, control and system tasks in power supply grids.

This problem is solved by a mobile energy storage module with an enclosing module housing, comprising at least one power connection interface and at least one data interface, wherein the energy storage module in the module housing additionally comprises a flywheel module having a plurality of flywheel energy storage units which, together, are connected to the at least one power connection interface via a DC link to provide a common module storage capacity and module output, a vacuum module for generating a minimum vacuum in the respective flywheel energy storage units required for operating the flywheel module, and a module control system that is configured to appropriately control the modules in the module housing, such as at least the flywheel module and the vacuum module, and to implement data communication via the data interface for carrying out control and system tasks in power supply grids, wherein the one or more power connection interfaces is/are at least provided for connection to a local and/or non-local power supply grid, wherein the one or more data interfaces is/are provided for receiving as external data at least the control and system tasks to be carried out in the connected power supply grids and for sending operating data to the outside, and wherein the module housing is configured in a suitable manner to ensure safe transport of the modules disposed therein and absorb static and dynamic loads of the flywheel energy storage units during operation.

The energy storage module according to the invention represents an energy storage system or a component for such an energy storage system that can be quickly deployed at any location desired in a variable manner and with small effort wherein, due to its modular structure, said energy storage system can be quickly and easily combined with or supplemented by other energy storage module, in order that the energy storage module or a combination of more than one of such energy storage modules acting as energy storage system provides a sufficiently large energy storage capacity and output for control and system tasks in power supply grids. In isolated cases, a single energy storage module, therein, also represents an energy storage system whereby the system storage capacity and system output is given by the module storage capacity and module output of the energy storage module. Likewise, the mobility of an energy storage system consisting of such energy storage modules is given by the mobility of the energy storage modules. Since the module housing is designed to be transported, the components inside the module housing achieve a mechanical stability that allows operating the energy storage module for a long time and moving the energy storage module to other installation sites. Furthermore, the modularity facilitates fast installation on site because all essential components for operating the energy storage module are arranged in the module housing and only have to be connected to the required electricity and data connections at the installation site via the power connection interfaces and data interfaces. Based on the modularity, the capacity available can be upscaled according to requirements via the number of energy storage modules. The individual energy storage modules are, thus, effectively utilized either autonomously or within a modular energy storage system and therefore be produced and operated cost-effectively. The energy storage module comprises modules in a module housing. These modules refer to the components required for operating the energy storage module, such as the flywheel module, the vacuum module and, preferably, a heating and cooling module if necessary.

To ensure mobility, the module housing encloses all of the modules and components installed therein. Herein, the term "enclose" refers to an all-sided delimitation of the energy storage module against the environment. This delimitation can, for example, be formed by a housing frame with top, bottom and side surfaces attached thereto. To achieve a robust module housing, the latter can, for example, be manufactured at least with a predominant content of concrete, metal or steel; preferably, it is completely made of steel. The enclosing module housing protects the contents of the module housing against effects from outside during transport or operation. Preferably, the modules in the module housing, more particularly the flywheel module, are protected during operation and transport by means of damping elements between the modules, more particularly between the flywheel module and the module housing. To absorb the static and dynamic loads of the flywheel energy storage units during operation, at least some of the damping elements can remain in the energy storage module even after transport. Due to its robust material, the module housing is, in addition, adapted to absorb static and dynamic loads that cannot be absorbed by the damping elements. Therein, it is required that the mechanical loads occurring during ordinary and extraordinary operation are discharged into the anchorage points installed for transport or into the local anchorage points. This can, for example, be achieved by means of a suitable steel frame in the module housing and/or in the module, with the individual flywheel storage units being attached to said steel frame with or without damping elements. Therein, the occurring loads can be discharged to the outside, for example, into foundations via predefined load transmission points. Therein, the module housing can have any dimensions that are suitable and allow transporting the energy storage module, for example, with motor trucks, cranes and/or transport ships. Therein, the module box may be a box or a container with anchorage or attachment points that are predefined to the outside.

A further essential object of the module housing is to ensure the thermal basic conditions required. To achieve this, the module housing is in one embodiment designed at least in a windproof and watertight manner and features an insulation layer that is adapted to maintain a controlled indoor temperature of, for example, 10° C. to 45° C. in the module housing. Ideally, the insulation layer is made of a windproof outside material such as, for example, steel, concrete or plastic with insulation foam or insulation wool disposed therebehind or therebetween. In a preferred embodiment, the insulation is arranged on the module housing inside or in the module housing. This protects the insulation layer against outside influences, such as weather and solar radiation, and its functional efficiency is preserved for a prolonged period of time. The term "in the module housing" refers to the integration of the insulation layer into the module housing (for example in sandwich construction as core layer) without the insulation layer being attached to a surface of the module housing. Ideally, the module housing also features heat exchangers for controlled heat dissipation, said heat exchangers facing outwards. For weather protection purposes, both the module housing and the heat exchangers and current supply lines are formed such that an ingress of water or large air volumes is prevented. To fulfill the thermal and mechanical protective effect, sandwich materials having a foam core with a thickness of more than 40 mm and, on the one hand, generating inherent stability and, on the other hand, insulate are, for example, ideal as insulation layer. To transfer the mechanical loads from inside outwards, the sandwich material can be reinforced on site by means of a built-in metal or metal-tube frame. Both the interior system points and the exterior attachment point can then be anchored in these frames. To further shield external thermal loads, such as direct solar radiation, suitable elements or structures, such as shields or collectors, can be provided.

In a further embodiment according to the present invention, the flywheel module comprises a common frame inside the module, to which the flywheel energy storage units are mounted and fitted. By being held in a frame, it is ensured that the flywheel energy storage units are fixed in position in relation to each other in a robust manner. Frames suitable for this end are, for example, steel frames that are made of I-beams or box profiles and are welded to each other. Therein, the moment of inertia and the material thicknesses of the frame are selected such that forces caused by ordinary and extraordinary operating loads result in a deformation of the frame that is not too significant. To achieve this, it may also be required to integrate shear reinforcements into the frame. Ideally, the frame is designed such that it can specifically transfer the force towards the module housing in order that the housing can transfer the forces to the housing foundation.

In a preferred embodiment, the frame is designed such that the flywheel module as a whole can be inserted into and removed from the module housing. As a result, the flywheel energy storage units outside the module housing can be pre-mounted to the flywheel module, this facilitating fast assembly of the flywheel energy storage units in the frame due to the assembly scope that is significantly increased as compared with the module housing. In addition, defective flywheel energy storage units can be quickly replaced by removing the frame from the module housing for the replacement and re-inserting the frame into the module housing after the defective flywheel energy storage unit has been replaced. The approach of an overall structure that is easy to maintain can, for example, also be supported by the geometrical arrangement of the flywheel energy storage unit providing a service corridor in the flywheel module through which every module component can be accessed and individual flywheel modules or system components can be taken out and replaced.

In one embodiment, the flywheel energy storage units are mounted to the frame of the flywheel module such that the mechanical energy of an individual flywheel energy storage unit can be discharged through structural components disposed in the frame in the event of an extraordinary failure such that neighboring flywheel energy storage units cannot be affected during operation.

In a further embodiment, the module housing is a standardized container, preferably an ISO container. Standardized containers are containers that are standardized with respect to their dimensions, for which suitable transport devices are available for fast transport to a different installation site, for example, suitable motor trucks, train wagons, or loading berths on transport ships and appropriate reloading sites in case the transport means must be changed. ISO containers are large-scale containers standardized according to ISO 668, with which the shipping, forwarding, storing and unloading of goods—an energy storage module in the illustrated instance—can be simplified and accelerated. The most widely spread ISO containers have a width of 8 feet and are either 20 feet or 40 feet long. Usual heights are heights that can be moved without any restrictions during transport by road. Depending on their dimensions, ISO containers have an inside volume of 33 m$^3$ to 86 m$^3$ and a maximum payload of 21 tons to 27 tons. From a technical point of view, it is favorable to design the weight of the module such that a weight is achieved that is favorable for transport, wherein the module should not be too light so that it can better withstand extraordinary loads. In contrast to the energy storage module according to the invention, flywheel energy storage units having larger capacities are connected to the underground of the installation site in a non-detachable manner according to the prior art, for example, embedded into a concrete foundation in the ground. Such units are installed in a stationary manner and cannot be removed without disassembling the complete system unit. They are therefore not mobile.

In a further embodiment, the module housing comprises on its bottom side or on one or more of its side surfaces ground fixing means for safe, preferably non-destructive-reversible, anchorage of the energy storage module to the ground. As a result, a firm and fast anchorage of the energy storage module can be achieved for self-supporting operation. These ground fixing means can, for example, be eyes or rings for attaching ropes or hooks or earth anchors for direct insertion into the ground foundation. When rings or eyes are used, the module housing can be quickly fastened to the appropriate base plate, for example, to concrete plates. Earth anchors allow temporarily setting up the energy storage module in a stationary and self-supporting manner, even on normal earth reinforced with strip foundations. To achieve this, this earth can, for example, have been smoothed and compacted beforehand. In addition to the safe and fixed erection of the energy storage module, the type of the ground fixing means mentioned above simultaneously allows quick and easy removal of the energy storage module for potential transport to a different installation site if there is no demand for module storage capacity and module output at the existing installation site. Since large amounts of energy are stored in the module, the module housing is, at the same time, also configured as technical and personal system protection. Here as well, the robust construction of the module in concrete or metal sandwich technique with integrated frame elements is helpful to impede any forcible entry. When the module is set up in public, it additionally requires impact protection which is achieved by means of robust steel or concrete frames, reinforced corners and sufficient area moments of inertia of the walls as well as appropriate wall materials. In one embodiment, the module housing is designed such that impact and other outside loads can be processed such that it can be set up in public without putting the operational safety at risk.

Therein, the module can also meet visual requirements. Since mobility is required, it is also desired to set up the module in the midst of public places. In this context, the module can, for example, be used as an advertising or communication panel.

The module control system and the existing power connection interfaces allow the energy storage module (or the energy storage system built therefrom) to carry out different storage, control and system tasks in, where applicable, separately connected local and non-local power supply grids and, therefore, to effect a simultaneous improvement of local grid quality in the local power supply grids and security of energy supplies in non-local power supply grids. Herein, the energy storage module can either be directly connected to a non-local power supply grid and to one or more local power supply grids or be indirectly connected to a non-local power supply grid via a connected local power supply grid, provided the local power supply grid itself is connected to the non-local power supply grid. This applies particularly when the energy storage module is operated separately without any further additional energy storage modules. Therein, the control and system tasks to be carried out comprise localized and non-localized control and system tasks. Therein, localized control and system tasks relate to local power supply grids and comprise, for example, securing the line voltage required, the reactive power compensation, the regulation of the amplitude and phase position of the voltage signal, the provision of a local power reserve for major electricity consumers that might additionally be connected or for start-up peaks, and the storage of local excess amounts of energy. Therein, non-localized control and system tasks relate to non-local power supply grids and comprise, for example, the provision of primary and secondary reserve power. The reserve power ensures supply in the event of unforeseen incidents in the power supply grid. To achieve this, the output of power stations that are capable of producing reserve power can be adjusted for a short time, or rapidly starting power stations or energy storage systems, such as the energy storage system according to the invention, can be used. Further non-stationary control and system tasks comprise, for example, the support of a black start in the event of power failure, the general storage of power peaks, and the reactive power compensation in the non-localized power supply grid. Further localized and non-localized control and system tasks for local and non-local power supply grids are the provision of redundancy (fail-safe operation) of power supply in combination with the already existing energy suppliers, and reactive power management.

Herein, the non-local power supply grid refers to a power supply grid which extends over very large areas in a supraregional manner and in which the non-localized control and system tasks are carried out. Non-local power supply grids are, for example, transmission or distribution networks (public power supply grid). In Germany, the public power supply grid is, for example, composed of four transmission networks which are operated by the network operators Amprion, 50 Hertz, Tennet, and TransnetEnBW. Together, the four transmission networks form the Netzregelverbund for Germany (cooperation in terms of control power). In other countries, appropriate transmission networks are operated by other network operators. In the transmission networks, the frequency of the power supply grid is maintained at a stable value (frequency control). The superordinate wide area synchronous grid in Europe that is composed of the respective transmission networks in the individual states must also be considered to be a non-local power supply grid for which, however, only the standards for the reserve power are defined at the moment. The non-localized control and system tasks are carried out in the respective transmission networks. Local power supply grids within the meaning of the invention are power supply systems in which the localized control and system tasks described above are carried out. Normally, local power supply systems are considerably delimited in space, for example, an inhouse power supply system on a facility site or a power supply system inside a building or a complex of buildings.

The power connection interface refers to a device which can be used to release energy available in the energy storage module into or absorb such energy from an external power cable. Power connection interfaces are, for example, appropriately designed plug-and-socket connections (outlets) into which an appropriately designed plug can be inserted from outside for connection to the power supply grid. The power connection interfaces are, for example, commercially available connections for the amounts of energy to be transferred. The connection to the non-local power supply grid and to each of one or more local power supply grids can be configured by a person skilled in the art in a suitable manner, wherein the connection is designed such that the power supply grids (the non-local one(s) and the local one(s)) can also be supplied with energy from the energy storage system independent of each other or energy can be taken from the power supply grids. A power connection interface can also be used to implement the supply of the energy storage module and its components and modules with operating current.

The data interface refers to a device which can be used to connect an internal data line to another data line that is run to the energy storage module from outside, in order to establish a data connection. The data interfaces can, for example, be commercially available interfaces for data connections. The data lines in the energy storage module and between the energy storage modules can have any form that is appropriate. In one embodiment, the data line is configured as a data bus system such as, for example, as CAN bus, Profibus or Ethernet. However, the data interfaces can also be configured to establish a connection to a wired communication network, for example, to a radio-based network, a mobile network, a network according to IECG, a wired telephone network, a data connection by means of the power cables in the power supply grid, or a computer network (for example, the internet). This is to advantage in that more than one alternative interfaces are available. In the event of an interrupted connection via one of the aforementioned networks, the energy storage module, more particularly the module control system, can be designed to re-establish the connection via a different interface of the energy storage module through an alternative network. Due to the redundancy of the data interfaces, possibly important external data, more particularly control commands, can nevertheless be received via alternative communication networks.

The term "receive" refers to any type of activity in which external data are transmitted to the energy storage module or to the energy storage system. These external data are, for example, control commands on the basis of which the module control system controls the energy storage module. External data can also be test signals for testing a data connection from and to the outside or any other data. The external data are transmitted by external systems, for example, control systems of the local power supply grid for localized control and system tasks and/or control systems of the non-local power supply grid, a superordinate interconnection control or local measuring points for localized and/or non-localized control and system tasks. These control commands (external data) comprise the localized and non-localized control and system tasks that are carried out by the energy storage module according to the invention within the scope of its possibilities. However, the external data (control commands) can also be received by a data carrier via a data interface by being read from a corresponding data carrier drive (for example, a CD-ROM) or via a data carrier interface (for example, a USB data stick). Alternatively, the external control commands (external data) can also be received by direct input via a corresponding user interface (screen and keyboard).

The term "send" refers to the transmission of operating data that are generated in an energy storage module according to the invention or in an energy storage system having a more than one of such energy storage modules. On the one hand, the transmission can refer to sending operating data of the energy storage module to the outside in order that the particular operating data can be taken as a basis for the control and system tasks to be received. On the other hand, however, the transmission can also refer to sending a test signal for testing an existing data connection via the data interfaces. This connection test can refer to a test of an external data connection or the test of the data connection to possibly connected energy storage modules in an energy storage system. The transmission can also comprise sending control commands of a module control system to other module control systems in an energy storage system having more than one energy storage modules.

Herein, flywheel module refers to the functional unit consisting of the respective flywheel energy storage units and their mechanical attachment. Therein, the flywheel energy storage units comprise the rotor via the rotation of which the energy can be stored and released again in the form of mechanical rotational energy, the bearing and motor components for accelerating, decelerating and rotating the rotor at a specific speed, and the connections to other modules disposed in the module housing, such as the vacuum module or an internal power supply unit for the modules. Depending on their charge condition, rotors of flywheel energy storage units can rotate at a speed of, for example, 50,000 revolutions per minute. A typical speed range is between 15,000 revolutions per minute and maximum speed. In order that the rotors of the flywheel energy storage units rotate with as low a loss as possible and therefore be able to store the energy with as low a loss as possible, they are enclosed by a rotor housing wherein, during operation of the flywheel module, the pressure generated in the respective rotor housings is as low as possible. The lower the pressure and the density of the gas in the rotor housing, the lower the frictional losses of the rotor on the filling gas of the rotor housing. For this reason, the housing is either filled with a light gas, such as helium, or evacuated to pressures of less than $10^{-3}$ mbar. The flywheel module with the flywheel energy storage units has a module storage capacity with a module output which scales with the number of flywheel energy storage units. This storage of the energy in the form of rotational energy is reversible because the energy that is stored as rotational energy can be extracted from the flywheel energy storage units according to requirements and be released by the energy storage module or the energy storage system as electric energy into a power supply grid and, in the opposite case, electric energy can be absorbed from the power supply grid and be mechanically stored in the flywheel energy storage units in the form of rotational energy. Flywheel energy storage units are to advantage in that they make the amounts of energy to be absorbed or released available to the consumers in a highly variable and precise manner and store this energy in the form of mechanical energy. As a consequence, flywheel energy storage units cause a potential hazard in the event of fire that is considerably smaller than, for example, that of a large accumulation of batteries interconnected as a battery energy storage system or hydrogen storage systems with hydrogen tanks containing combustible hydrogen as a potential hazard. Although, in contrast, non-combustible gases can be used for storing energy in compressed air reservoirs, compressed air tanks nevertheless pose a potential explosion hazard because of the high pressure in the compressed air tanks. Flywheel energy storage units therefore represent an energy provision technology that is environmentally safer than other storage technologies and are well suited for any number of load cycles per day desired. Energy provision is referred to as negative energy provision when energy is absorbed from the power supply grid and is stored in the flywheel energy storage units in the form of mechanical rotational energy. Accordingly, energy provision is referred to as positive energy provision when energy that is stored in the form of mechanical rotational energy is absorbed from the flywheel energy storage units by decelerating the flywheels (or rotors) and is fed into the power supply grid as electric energy. Herein, the capability of flywheel energy storage units to provide energy within a few milliseconds is just as advantageous as the capability to provide the specified power over a period of a plurality of minutes. At a speed of 50,000 revolutions per minute, a flywheel energy storage unit can, for example, absorb or release a power of 5 kWh.

Many applications in the power supply grid require that an energy storage unit should have sufficient capacity and output. Typically, a capacity of 100 kWh and higher is referred to as large capacity and an output of 500 kW and higher is referred to as large output. With these capacities and outputs, perceptible grid services can already be provided in local grids. Many applications in the high-voltage grid require a minimum output of one or five MW, respectively. For this reason, energy storage modules should be dimensioned such that already a single energy storage module can be used locally and a few energy storage modules, together forming an energy storage system, generate an output and capacity sufficient for the transmission network. The capacity and output of a single flywheel energy storage unit is also derived therefrom. This capacity and output must be sufficient to utilize the space available in the module such that the desired module output and module capacity are achieved. Flywheel energy storage units having a capacity of approx. 5 kWh and an output of 20 kW can, for example, be interconnected in a container to form an energy storage module having a capacity of 150 kWh and an output of 600 kW.

In one embodiment, the energy storage module comprises a cooling and/or heating module to remove at least internal thermal loads during operation of the flywheel module or to condition the air during operation of the flywheel module, preferably also to maintain a minimum temperature. Here, the cooling module refers to a device for cooling the system in order that the internal thermal loads, such as electrical losses, the frictional heat during operation of the flywheel energy storage units and the waste heat of the modules, such as the vacuum module, can be discharged. If the internal temperature of the module housing is too high, the risk of the electronics, more particularly the power electronics, disposed therein to fail is increased. Here, the maximum temperatures allowed in the module housing are, typically, 45° C. A heating module, however, ensures that the temperature in the module housing does not fall below the lowest temperature of 10° C. so that water condensation is prevented. Therein, outside temperatures usually range from −20° C. to 50° C. and, in extreme cases, lowest temperatures of −30° C. and highest temperatures of 60° C. must be tolerated. If allowed by losses, passive cooling/heating units, such as plate heat exchangers on the ceiling of the module housing, should be preferred as heating and cooling unit, said plate heat exchangers facilitating a cooling agent flow and heat exchange passively via convection because they have a less negative effect on the overall system efficiency.

The master control system is a component in the energy storage module, said component controlling the energy storage system, i.e., setting the desired operating states and operating parameters, and automatically controlling the energy storage module according to an electronically devised operating plan that contains the desired operating states as a function of time. The module control system calculates and devises the operating plan at least based on the external data (control commands) regarding the localized control and system tasks, to which the external data (control commands) regarding the non-localized control and system tasks are or can be added. Furthermore, the module control system is able to appropriately respond to changing conditions in the local power supply grid and to increase or keep constant the grid quality of the local power supply grid by releasing or absorbing energy or to re-improve the grid quality of the local power supply grid in the event of a failure in the latter. Below, the received external data (control commands) are also referred to as instructions. Herein, the term "carry out" refers to the module control unit controlling the energy storage module according to the present control commands for the localized and non-localized control and system tasks for the connected power supply grids. The external data are, for example, transmitted by an external control unit which, for example, determines the demand for the reserve power for the non-local power supply grid and can request this demand from the energy storage module via the communication network within the scope of the free capacities of the energy storage module (i.e., the capacities of the energy storage module that are not required for localized control and system tasks) in the form of non-localized control and system tasks. Further external systems from which the energy storage module may receive non-localized control and system tasks would, for example, be a power support interconnection or an energy exchange based on which the Emission or absorption of energy during is identified as appropriately low-priced during specific operating times. Further external variables for non-localized control and system tasks are, for example, the demand for reactive power, a peak load compensation, or local storage demand required in the non-local power supply grid.

In order to carry out control and system tasks, the module control system according to one embodiment comprises a priority management unit for carrying out the individual external data (control commands), wherein carrying out the external control commands regarding localized control and system tasks in the local power supply grids has priority over carrying out the external control commands regarding non-localized control and system tasks in the non-local power supply grid. The priority management unit can be implemented as a data memory which the module control system accesses before it carries out the external control commands and carries out the next external control commands according to the priorities set. Therein, the priorities can be stored in the data memory in a manner that is unchangeable with respect to external access. For example, priorities can be changed by replacing the respective data memory or the respective file containing the priority management unit on site in the energy storage module. In case of a single energy storage module, the free capacity is either sufficient to fulfill the non-localized control and system tasks under normal conditions, or the additional capacity that is reserved for localized control and system tasks would not be sufficient as a potential reserve for solving the grid problem in exceptional cases. In this respect, the priority of the localized control and system tasks is based on the finite module or system storage capacities and module or system outputs.

In case of disturbed reception of the external data (control commands), the module control system according to a further embodiment is provided to have the module storage capacity and module output only available for carrying out the localized control and systems tasks in the connected local power supply grid(s) until external data can again be received. To detect a failure in data reception, the module control system can periodically send out test signals to the outside and process the absence of a corresponding return signal as the verification of disturbed reception. For example, such a test signal is a so-called digital handshake which is used to verify whether or not the communication connection exists. The preference of localized control and system tasks is appropriate in that, after communication to the outside has failed, the module control system no longer receives any feedback on the current state of the non-local power supply grid. If the module control system then simply processes the present tasks without further external data (control signals) to be received, this could under special circumstances even result in a failure of the power supply grid because of overload. Therefore, it is to advantage to only carry out the localized control and system tasks which the energy storage system is obliged to carry out and can, if necessary, keep the appropriateness of these localized tasks under surveillance itself via its own measuring units.

In one embodiment, the energy storage module comprises one or more measuring units for measuring single or more than one relevant data in the respective connected power supply grids, and the module control system is provided to control the energy storage module for the localized control and system tasks by using the external data (control commands) in these local and non-local power supply grids based on the measured relevant data. Therein, the measuring units can be integrated into the local and/or non-local power supply grid or be arranged at one or more points of the local power supply grid. The measuring units can also be arranged at the connecting point between the energy storage module and the local and/or non-local power supply grids. Measuring units within the scope of the present invention are, for example, measuring probes for measuring the line frequency and the line voltage as an example of relevant data for the connected local power supply grid. Further measuring variables are, for example, the voltage trend as a function of time, the phase angle, the neutral point, the line frequency, the line current, and other variables. Within the scope of the present invention, the person skilled in the art can select suitable measuring units or measuring probes and arrange them at the appropriate position. If, for example, the desired line frequency is 50 Hz and the measuring units detect that the line frequency is decreasing, the master control system will automatically feed energy into the local power supply grid (localized control and system task) on the basis of the currently measured line frequency (as measured relevant data) and according to a response hierarchy filed in the master control system, until the line frequency has again reached the desired value. Further examples are the measurement of the phase angle in the local power supply grid in order to provide the appropriate reactive power compensation, or, if the load consumed in the local network is too high or too low, the measurement of the voltage to maintain the voltage quality. For other control and system tasks, other appropriate response hierarchies are filed in the module control system.

In a further embodiment, the energy storage module comprises a task memory for storing the received external data (control commands) regarding the non-localized and localized control and system tasks, which the module control system accesses for controlling the energy storage module according to the non-localized and localized control and system tasks. The task memory may be a suitable data memory in the energy storage module. Therein, it can be designed as a part of the module control system or a separate memory. In either case, the module control system is connected to the task memory via a data connection such that it can access the task memory at any time, read the non-localized and localized control and system tasks stored therein and control the energy storage module according to these tasks. Within the scope of the present invention, the person skilled in the art can configure the circuit-related access of the module control system to the task memory and the energy storage module to be activated in an appropriate manner. The instructions (external data or control commands) regarding the non-localized and localized control and system tasks can, for example, be stored in the task memory as the following instruction: "Storing from the non-local power supply grid xx kWh on day y beginning at zz hours". In a further example, the instruction in the task memory might be: "Releasing xx kW per hour into the local power supply grid beginning at zz hours today". The person skilled in the art can select the concrete data format of the instructions within the scope of the present invention in an appropriate manner. These instructions (or tasks) in the task memory can, for example, refer to a reserve power or the stabilization of a voltage or electric current. Therein, the instructions (or tasks) can be stored with or without time reference. An instruction (or task) without time reference may, for example, be as follows: "Supplying the appropriate reserve power subject to the grid frequency deviation of 50 Hz according to a specified curve".

In a further embodiment, the module control system is configured to register and evaluate operating data of the energy storage module and to transmit via one of the data interfaces a reporting protocol, for example, to corresponding external systems from which the energy storage module receives the external data, said reporting protocol comprising the operating data. In this manner, at least the operating data for the external data (control commands) to be received can be taken into account. For example, the operating data of the energy storage module show the available module capacity and module output and the (currently) free non-local capacity (the module capacity that is not required for the localized control and system tasks) and the (currently) free non-local output (the module output that is not required for the localized control and system tasks) available in the energy storage module for non-localized tasks and/or the localized control and system tasks planned for the future. Therein, the operating data can be measured by the module control system via operating sensors or other modules in the module housing, for example, the flywheel module, transmits operating data to the module control system via appropriate data lines which connect the modules to each other. The operating data registered in this manner are evaluated by the module control system according to a scheme filed in the module control system, for example, by means of an appropriate software program, and are then transmitted as operating data in predefined format via the data interfaces already described above. The clock pulse for the transmissions is, for example, 1 Hz or less. For example, the module control system registers the actual values of the energy module storage states and the storage states of the individual flywheel energy storage units, respectively, the states of the connected power supply grids (for example, voltage and current), and allocates these data for carrying out the localized and non-localized control and system tasks. The reporting protocol can, for example, comprise not only the operating data but also the identity of the energy storage module in the form of a characteristic designation such as an identification number and, possibly, the location at which the energy storage module is set up in the form of geographic coordinates. Therein, the reporting protocol has a data format that is adapted to be received and processed by the desired external bodies. The transmitted operating data, including the information about the actual and planned data of free module storage capacities and free module outputs, can then be received and appropriately planned by an external control unit and, subsequently, corresponding system-specific non-localized or localized control and system tasks can be transmitted back to the energy storage module in the form of external data (control commands).

In one embodiment, the module control system is provided to carry out localized control and system tasks in one or more connected local power supply grids and/or non-localized control and system tasks in a connected non-localized power supply grid and, to achieve this, instructs at least the storage module to absorb or release energy via the one or more power connection interfaces and distributes a corresponding energy flow to the local and/or non-local power supply grids by means of a regulating unit in an appropriate manner. By simultaneously carrying out localized and non-localized tasks and by simultaneously controlling all connected power supply grids in an appropriate manner, the requirements in the connected local and non-local power supply grids can be met simultaneously and efficiently. Furthermore, the system storage capacity and the system output can be effectively utilized based on the combination of localized and non-localized requirements (effective operation), thereby helping to save resources.

In a further embodiment, the electric link is configured as a common DC bus which is connected to a power converter or a forward converter. During operation, the module control system regulates the voltage of the DC bus to a defined constant level (target DC voltage) within specified limit values. As a result, the energy storage module can provide a constant voltage for the connected power supply grid until the energy storage module has been completely discharged, doing this in an autonomous manner and independent of the potential charge conditions of the flywheel energy storage units as compared with other possible electric interconnections. Therein, the target DC voltage depends on the connected external power supply grids and the components used in the energy storage module. When the system is connected to a low-voltage system, a technically reasonable range for the DC link voltage is, for example, from 550 V to 1000 V. In essence, the lower limit is defined by the voltage position of the low-voltage system whereas the upper limit is, in essence, defined by the technical properties of the components used in the energy storage module. Where medium-voltage or direct-voltage systems are concerned, the target DC voltage in the DC link can, for technical and economical reasons, have other values which are based on the voltage position of these systems. In one embodiment, the target DC voltage in the DC link is 750 V±5 V.

In a further embodiment, the number of flywheel energy storage units in the flywheel module is adapted to provide a module storage capacity for the energy storage module which at least suffices to be able to release nominal current into a non-local power supply grid within a time period of more than 30 s up to a few hours. For example, up to 30 flywheel energy storage units that are disposed in a standardized 40" container, are running at a speed of up to 50,000 rpm and have an individual motor output of 200 kW with an individual capacity of 5 kWh can supply electricity for approx. 3 minutes. The speed for operating the flywheel energy storage unit typically ranges from 15,000 revolutions per minute to maximum speed, depending on the charge condition.

In a further embodiment, the vacuum module comprises a common vacuum pump stage for generating an operating vacuum and a pipe system to which the flywheel energy storage units are connected. As a result, a plurality of flywheel energy storage units that are arranged in compact construction design in the module housing can be supplied with a vacuum pump that is present in a single stage only. Therefore, the required operating vacuum can be effectively generated for the flywheel energy storage units with only a low number of components. Depending on the desired efficiency and vacuum volume, it may be necessary to set up a vacuum module that consists of a booster pump and a main pump and ensures operating pressures of less than $10^{-3}$ mbar during operation. Therein, the individual flywheel energy storage units are connected to each other via a pipe system. Usually, the pipe system features a ring main with a sufficient volume and small feeder lines which connect the ring main to the individual flywheel energy storage units. Line cross-sections should be selected such that the individual flywheel energy storage units can be sufficiently evacuated even at a very low pressure and even if the volume flow is no longer of a laminar nature. For example, a ring line diameter of >150 mm and a feeder line diameter of >50 mm are reasonable in a module housing that is designed as a 40" container.

In one embodiment, the one or more power connection interfaces and the one or more data interfaces are provided for connection to further energy storage modules. This facilitates a modular structure of an energy storage system having more than one energy storage modules according to the invention.

Furthermore, the invention relates to an energy storage system having more than one energy storage modules according to the invention, wherein the energy storage systems are connected to each other by means of a common data network at least via the data interfaces and the respective module control systems are configured for common control of the energy storage system in order to provide a common system storage capacity and system output from the sum total of all module storage capacities and module outputs in the power supply grids connected to the energy storage system. Herein, the energy storage system can either be directly connected to a non-local power supply grid and to one or more local power supply grids or be indirectly connected to a non-local power supply grid via a connected local power supply grid, provided the local power supply grid itself is connected to the non-local power supply grid.

Due to the modular structure, the total capacity (system capacity) and the total output (system output) of the energy storage system can be flexibly and quickly adjusted to the demands in the local and/or non-local power supply grids and, thereby, a fair compromise between operating expenses and operating benefits in terms of grid quality and available reserve energy can be reached. Due to the modular structure, it will also be possible at a later point during operation to expand or downsize the energy storage system as required, in order to be able to respond to varying energy demands in the connected power supply grids. As a result, the energy storage system can always be operated effectively, i.e., without unused excess capacity. To expand the modular energy storage system according to the invention, it is only necessary to connect a newly added energy storage module to the data network for the already existing energy storage modules and to the power connections of the energy storage system. To realize the modular structure, every energy storage module comprises a power connection so that every energy storage module is adapted to feature a separate electrical connection to one or more power supply grids and can therefore be operated in a largely autonomous manner in terms of the technical system equipment. The data network (data lines) in the energy system among the energy storage modules can have any form desired. In one embodiment, the data network is configured as a data bus system such as, for example, as CAN bus, Profibus or Ethernet. The data network among the individual energy storage modules serves the module control systems for mutual exchange of data regarding the common control of the energy storage system. Here, the control and system tasks to be carried out are distributed among the individual energy storage modules logged on to the overall system, with the result that the energy storage system can fulfill the control and system tasks within the scope of its system storage capacity and system output. For example, the energy to be absorbed or the energy to be released is distributed among the energy storage modules in equal amounts (portions) of energy. The individual energy storage modules will then release the corresponding portions of energy into the power supply grids or absorb the corresponding portions of energy from the power supply grids. The person skilled in the art can also file a different distribution plan in the module control units.

In one embodiment, the power connection interfaces of all energy storage modules are connected in a common connection point for connection to a non-local and at least one local power supply grid. As a result, the module storage capacities and module outputs of all energy storage modules are combined in one point to form a system storage capacity and system output, and all power supply grids connected to the connection point profit from the existing energy storage systems. Furthermore, the connection point allows fast and easy connection of further energy storage modules to already connected power supply grids without these power supply grid connections having to be modified to achieve this in case of an expansion (or removal of an energy storage module). Energy storage systems having only one connection to a power supply grid, for example, a local power supply grid that is connected to a non-local power supply grid are typically connected to the single power supply grid via a switch. In this case, it would not be required to control an energy flow because all of the energy flows into the single power supply grid (or vice versa). The switch is provided to be able to disconnect the energy storage system from the power supply grid in the event of a power failure.

In a further embodiment, a regulating unit which is configured to regulate or control an energy flow between two or more connected power supply grids and the energy storage system is arranged between the connection point and the connected power supply grids. If the local and non-local power supply grids were only rigidly connected to the connection point of the energy storage system, the energy fed in by the energy storage system would only be fed into the power supply grid that has the bigger demand for energy. In the present invention, the regulating unit is additionally equipped such that, after one power supply grid has been disconnected, the other connected power supply grids will still be supplied with energy as desired or that energy can be absorbed from these power supply grids because the energy storage system has to supply more than one separate power supply grids at the same time within the scope of the present invention. The regulating unit controls the energy flow to the connected networks in the manner provided by the module control system. In a preferred embodiment, the regulating unit is furthermore provided to disconnect one or more connected power supply grids from the energy storage system in case of need. In the event of a failure of one of the connected power supply grids, the regulating unit disconnects this power supply grid from the energy storage system at once, i.e., within a few milliseconds, in some circumstances to ensure that the energy storage system continues to be operable for the other power supply grids. Otherwise, a short circuit or an overload situation would occur as the case may be. In a further embodiment, the regulating unit comprises for this purpose a regulating box having at least one control element and one or more circuit breakers which are controlled by the control element and the number of which depends on the number of power supply grids connected to the regulating unit. Therein, the regulating box is connected to the module control system via a data line, either directly or through the regulating unit, wherein the module control system can use said data line to transmit the configuration data of the regulating function to the control element.

In a further embodiment, one of the module control systems is provided as master control system and the other module control systems are provided as slave control systems, wherein the master module system is provided to transmit to the slave control systems via the data network instructions for controlling the flywheel energy storage units for jointly carrying out the control and system tasks to be carried out in the connected power supply grids. Herein, the master control system (leading module control system) has the module storage capacities and module outputs of all of the energy storage modules connected to it and carries out the non-localized control and system tasks within the scope of the portions of the system storage capacities and/or system output that are not required for the localized control and system tasks. Herein, the slave control systems (also referred to as dependent control systems) refer to module control systems which control their respective energy storage module subject to the instructions from a master control system. Communication between the master control system and the connected slave control systems for the purpose of controlling the energy storage system can, for example, be actively achieved via a reporting protocol wherein, after the reporting protocol has been sent, the slave control systems and/or the master control system can respond to the reporting protocol by giving the appropriate answers or reactions. Communication can also be initiated by the module control system due to direct request signals. The slave control systems control and monitor the operating states of the respective energy storage modules and transmit the operating data BD of their energy storage module to the master control system via the data line. Here, the slave control systems are jointly controlled by the master control system by the latter instructing the slave control systems to carry out the control and system tasks and the individual slave control systems implementing the instructions into corresponding machine parameters for their flywheel energy storage units. Alternatively, the slave control systems can be done without and all of their functions can also be executed by the master control system. The control is effected in that the master control system tells the individual energy storage modules how much energy should be released from the flywheel energy storage units by means of deceleration or be absorbed in the individual flywheel energy storage units by means of acceleration. In order to ensure that this energy absorption or release can be achieved as desired, the slave control systems thereupon control the drive motors of the flywheel energy storage units such that they decelerate or accelerate the individual rotors in the flywheel energy storage units.

Furthermore, the invention relates to a method of providing energy for localized and non-localized control and system tasks in a variable manner, comprising the following steps:
- determining the system storage capacity and system output required for carrying out the desired control and system tasks in the particular power supply grid(s) to be connected;
- setting up a number of energy storage modules according to the invention having respective module storage capacities, module outputs and module control systems at an installation site, wherein the number of energy storage modules is selected such that the sum total of all module storage capacities and module outputs corresponds to the required system storage capacity and system output;
- anchoring the module housing of the energy storage modules to the ground at the installation site;
- connecting the energy storage modules in a common connection point and subsequently connecting the connection point to the particular power supply grids and connecting the energy storage modules to each other by means of a common data network to form a common energy storage system;
- jointly controlling the energy storage system via the respective module control systems, preferably by means of a selected master control system, for providing a common system storage capacity and system output in the connected power supply grids for the control and system tasks to be carried out therein; and
- adjusting the energy storage system to a changed demand for system storage capacity and system output by adding further energy storage modules according to the invention by following the aforementioned method steps or by removing one or more energy storage modules from the energy storage system after all power connections for the particular energy storage module to be removed have been disconnected from the connection point, all data interfaces have been disconnected from the data network and the module housing has been detached from the installation site.

SHORT DESCRIPTION OF THE FIGURES

These and other aspects of the invention will be shown in detail in the figures below. In the figures, FIG. 1 is a perspective view of an embodiment of the energy storage module according to the invention;

DETAILED DESCRIPTION OF THE EXEMPLARY EMBODIMENTS

Figure 1:
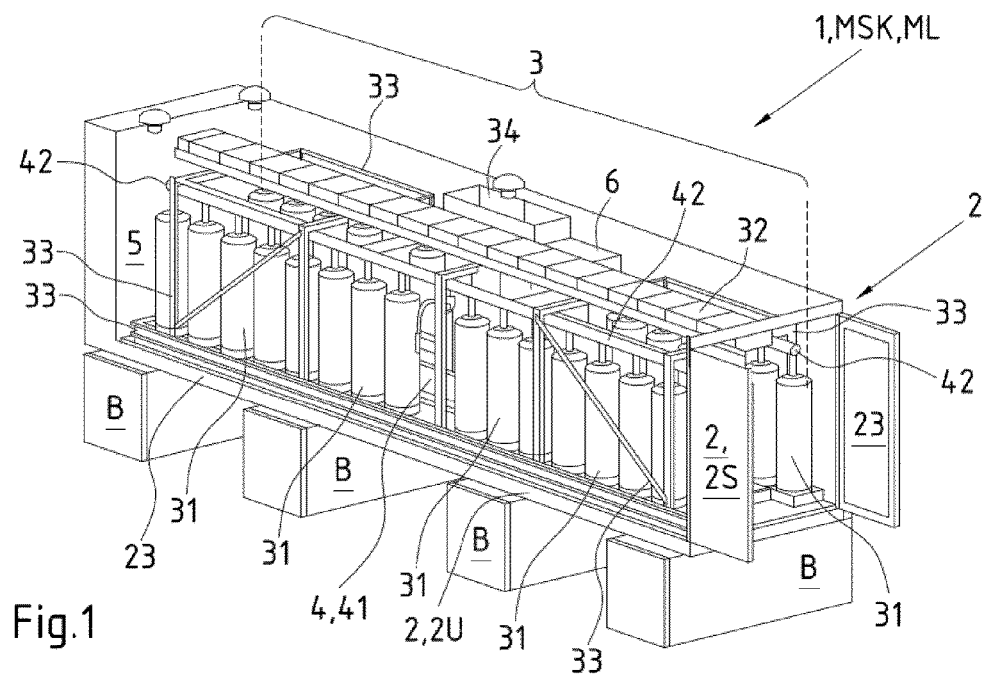

FIG. 1 is a perspective view of an embodiment of the energy storage module 1 according to the invention. The mobile energy storage module 1 has an enclosing module housing 2 which, in the illustrated instance, is only indicated to simplify matters and provide a view of the modules inside the module housing. In this embodiment, the module housing has the form of a longitudinal cuboid with four side surfaces 2S, a top side 2O (not shown) and a bottom side 2U the edge of which is visible. One of the side surfaces 2S is designed as a door in order that the modules 3, 4, 5 can be accommodated in the module housing 2 and be removed again if necessary. If necessary, the door also provides access to the energy storage module 1 for maintenance personnel. A flywheel module 3 having a total of twenty-eight flywheel energy storage units 31 is arranged in the module housing 2, the flywheel energy storage units 31 being connected via a DC link 32 for providing a common module storage capacity MSK and module output ML. The number of flywheel energy storage modules 31 is adjusted such that the energy storage module 1 can release electric current into a non-local power supply grid NS via the module capacity MSK and module output ML thus provided for a time period of more than 30 s. Therein, the individual flywheel energy storage units 31 can transfer an output of 20 kW on an average. As a result, this energy storage module 1 has a module storage capacity of 560 kW. The number of flywheel energy storage units 31 in an energy storage module 1 may vary from energy storage module to energy storage module. A high number of flywheel energy storage units 31 per energy storage module 1 is to advantage in that it increases the module storage capacity MSK and module output ML of the energy storage module 1. Therein, the rotational axis of the cylindrical rotors of the flywheel energy storage units 31 extends vertically to the surface on which the module housing 2 is set up, in the illustrated instance shown as a concrete foundation B that is subdivided into four parts. In other embodiments, however, the module housing 2 can also be positioned on a smoothed and, if necessary, hardened ground B. Therein, the flywheel energy storage units 31 are mounted to a frame 33 which also supports the bearings of the flywheel energy storage units 31. The form of the frame 33 shown in the illustrated instance is adjusted to the form of the module housing 2 and of the door at the end of the module housing 2, with the result that the flywheel module 3 consisting of the frame 33 and the flywheel energy storage units 31 and the DC link 32 can be inserted into and removed from the module housing 2 as a whole. The frame comprises vertical posts at each quarter of the length of the module housing, which are connected to the opposite posts through horizontal frame parts on the top and bottom sides in the module housing, in order to each form a rectangular frame running around the cross-section of the module housing. These rectangular frames that are five in total are connected to each other via horizontal beams along the longitudinal direction of the module housing 2 at the top and bottom on each longitudinal side. The resulting frame shape forms an open cuboid within the module housing 2 wherein the flywheel energy storage units 31 are held and mounted between the upper and lower beams on each side. Therein, the flywheel energy storage units 31 are mounted to the frame 33 of the flywheel module 3 such that the mechanical energy of an individual flywheel energy storage unit 31 can be discharged through structural components disposed in the frame 33 in the event of an extraordinary failure such that neighboring flywheel energy storage units 31 cannot be affected during operation. To achieve this, the neighboring flywheel energy storage units 31 are arranged side by side and spaced apart by an appropriate distance. In this embodiment, the vacuum module 4 is arranged centrally in the module housing 2, at least with the vacuum pump stage 41 which is connected to the individual flywheel energy storage units 31 of the flywheel module 3 via a pipe system 42 in order to evacuate the rotor container in the flywheel energy storage units 31. On the inside of the module housing 2, the module housing 2 has an insulation layer 23 that is indicated in the vicinity of the ground and the vicinity of the door. The insulation layer 23 allows generating a controlled indoor temperature in the module housing 2 in cooperation with the cooling module 5. The cooling module 5 is indicated schematically and is supposed to discharge internal thermal loads developing during operation of the flywheel module 3 from the module housing 2 to the outside. Therein, the module housing 2 can be made of metal, preferably of steel, to represent a robust shell for transporting and operating the energy storage module. Dimensions can be adjusted to the application and to the form of the modules in the module housing 2. Preferably, the module housing 2 has a standardized form in order that it can be transported with the transport means available and does not require any special treatment for transport. Preferably, the module housing 2 is an ISO container as it is shown in the illustrated instance. Furthermore, the module housing 2 comprises a module control system 6 that is provided for appropriately controlling the modules 3, 4, 5 and, where applicable, further modules in the module housing 2 that are not shown in the illustrated instance, in order to allow carrying out control and system tasks in power supply grids. To achieve this, the modules 3, 4, 5 and the module control system 6 are connected to each other via a data bus 61 (without illustration) in order that the module control system 6 can transmit the control commands to the respective modules 3, 4, 5 for the purpose of their implementation.

Figure 2:
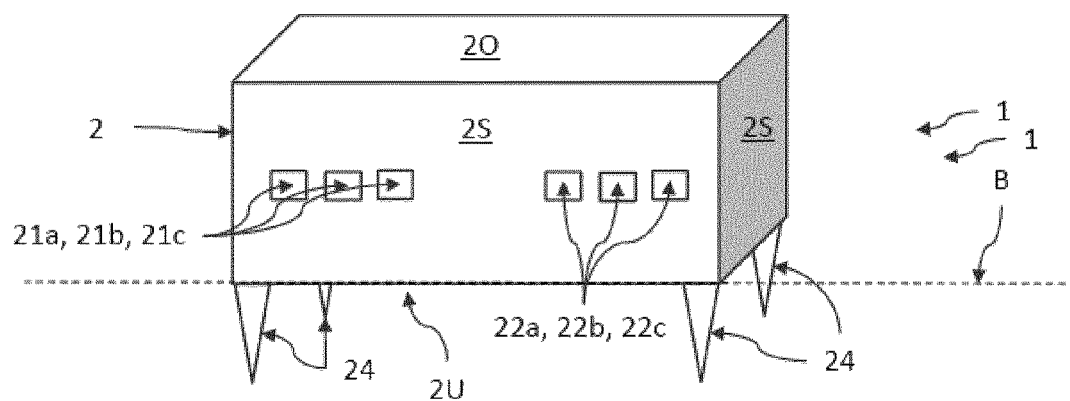
FIG. 2 is a perspective view of a further embodiment of the energy storage module according to the invention.

FIG. 2 is a schematic perspective view of the module housing 2 of the energy storage module 1 shown in FIG. 1, having a top side 2O, a bottom side 2U and four side surfaces 2S. In addition, the module housing 2 is designed such that it is windproof and watertight (closed side surfaces 2S, bottom side 2U and top side 2O). Three power connection interfaces 21a, 21b, 21c are each arranged on the forward side surface 2S of the module housing 2, for example, for connection to a local and/or non-local power supply grid LS, NS in order to carry out the control and system tasks and to supply the modules in the module housing 2 with current. The likewise three data interfaces 22a, 22b, 22c are provided to receive EM at least the control and system tasks ORS, NORS to be carried out in the connected power supply grids as external data ED and to send operating data BD to the outside. The presence of three interfaces allows achieving redundancy by using different communication networks for communication. On the bottom side 2U of the module housing 2, ground fixing means 24 for reliably and reversibly anchoring the energy storage module 1 to the ground B are arranged in the four corners of the bottom side 2U. In the embodiment shown in the illustrated instance, the ground fixing means 24 are earth anchors in order that the energy storage module can be positioned on a foundation and has nevertheless a stability appropriate for operation so that the static and dynamic loads of the flywheel energy storage units 31 can be discharged into the ground during operation. Due to the weight of the energy storage module 1, the earth anchors 24 penetrate into the ground B over their full length, thereby giving the module housing 2 a considerable stability.

Figure 3:
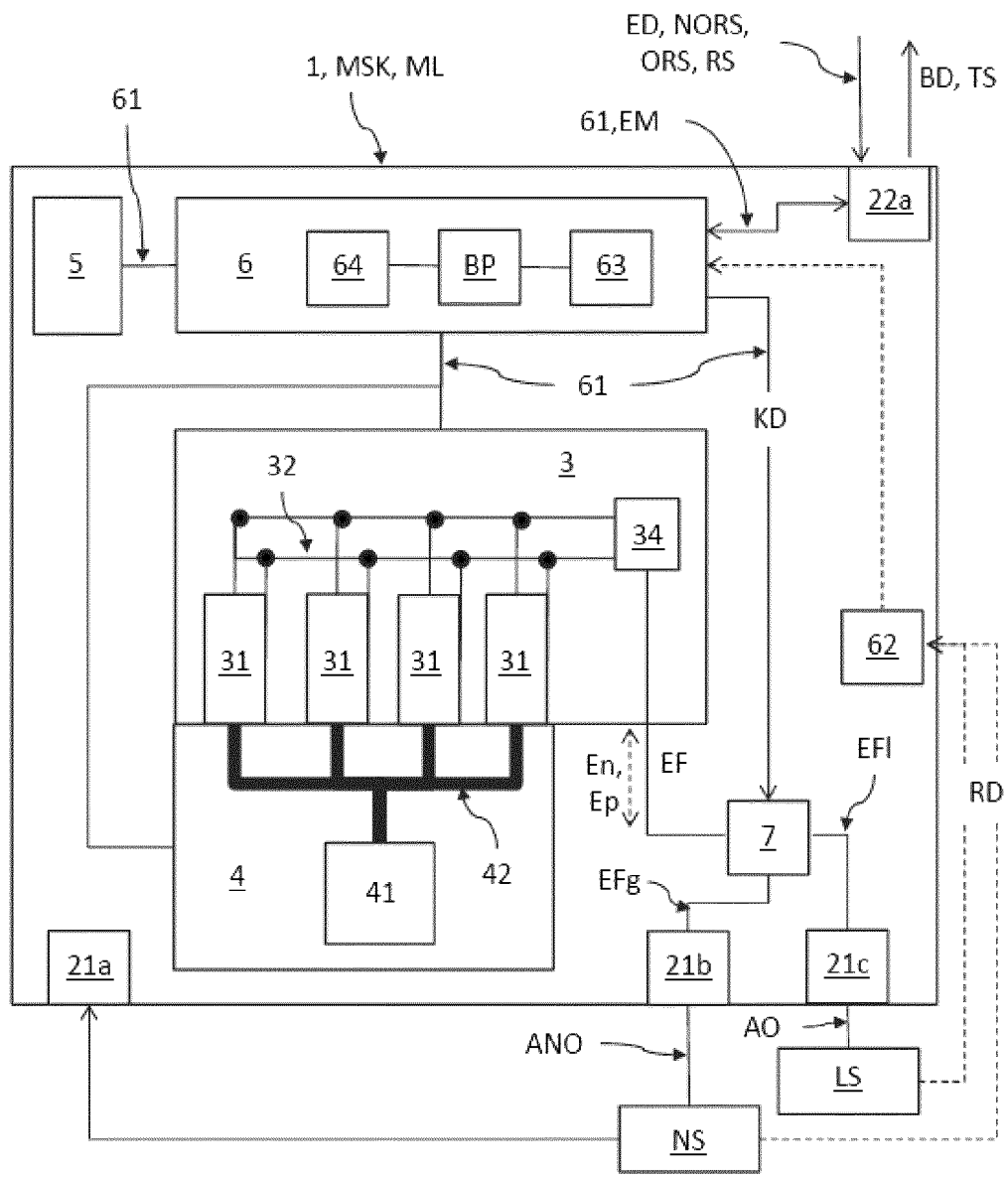
FIG. 3 is a schematic representation of the modules of the energy storage module according to the invention.

FIG. 3 is a schematic representation of the energy storage module 1 according to the invention, comprising the internal connectors and data connections. To simplify matters, the energy storage module 1 according to this embodiment is shown with only four flywheel energy storage units 31 for the reversible storage of energy. In contrast, energy storage modules 1 intended for real operation comprise a considerably greater number of flywheel energy storage units 31. The flywheel energy storage units are switched in parallel via a DC link 32 which, in the illustrated instance, is configured as a common DC bus 32 which is connected to one or more power converters 34 or forward converters 34.

The individual modules of the energy storage module are connected to each other via the data line 61, for example, a data bus 61. A local power supply grid LS is connected to the energy storage module 1 via the power connection interface 21c, and a non-local power supply grid NS is connected to the energy storage module 1 via the power connection interface 21b. The non-local power supply grid NS is additionally connected to the power connection interface 21a in order that the energy storage module 1 is supplied with the operating current required for the modules (internal power lines are not explicitly shown in the illustrated instance). In order that the energy released Ep from the flywheel module 3 can be fed into the two connection power supply grids LS, NS in a properly distributed manner, the energy storage module 1 comprises a regulating unit 7, which is described in detail in FIG. 5, for splitting the energy flow into separate energy flows EFg and EFl into the separate power supply grids LS and NS. As a result, the complete module storage capacity MSK and the module output ML can be used for energy absorption En from and energy release Ep to one or more power supply grids NS, LS that is/are connected to the energy storage module 1. In an energy storage module 1 that is only connected to a local power supply grid LS connected to the non-local power supply grid NS, the regulating unit 7 comprises at least one circuit breaker. In this case, it is not necessary to split the energy flows because the complete energy flow EF ends in the local power supply grid LS. Alternatively, the system can also be equipped with a second or more additional forward converter(s) 34 and a second or a more additional circuit breaker(s) 7. In this case, the regulating box 7 can be omitted, where applicable. The energy storage module 1 comprises an interface 22a (to simplify matters, only one out of more than one potential data interfaces is shown in the illustrated instance) to receive EM external data ED regarding the localized and non-localized control and system tasks ORS, NORS to be carried out and a module control system 6 for storing S and carrying out AO, ANO the external data (control commands). The data interface 22a is also used to send operating data BD and/or a test signal TS to the outside in order to check an existing communication connection. Accordingly, the data interface 22a receives a corresponding return signal RS. In order to carry out ANO the non-localized control and system tasks NORS in the local power supply grid NS, the module control system 6, herein, has the module storage capacities MSK and module outputs ML only within the scope of the portions of the module storage capacities MSK and/or module output ML that are not required for carrying out AO the localized control and system tasks ORS. To achieve this, the module control system 6 comprises a priority management unit 64 for carrying out AO, ANO the individual external data ED (control commands), wherein carrying out AO the external data ED (control commands) regarding localized control and system tasks ORS in the local power supply grid LS has priority over carrying out ANO the external data ED (control commands) regarding non-localized control and system tasks NORS in the non-local power supply grid NS. This priority management unit 64 is, for example, designed as a data memory with a priority hierarchy stored therefrom. The priority hierarchy can be available in the form of a file which can, for example, be replaced or modified on site. In one embodiment, it is provided that, for system safety reasons, it is not possible to access the priority management unit 64 via the data interface 22a. Inter alia, the control is effected in that the module control system 6 tells the individual flywheel energy storage units 31 how much energy should be released by means of deceleration or be absorbed by means of acceleration, and in that the regulating unit 7 is appropriately activated by transmitting configuration data KD for the regulating function. Furthermore, the module control system comprises a task memory 63 in which the received EM external data ED about the control and system tasks to be carried out are stored. Prior to storage, the external ED may be checked for origin and content, said storage being refused if necessary in case the check fails to be successful. The module control system 6 can access the task memory 63 and create an operating plan BP according to the external data ED and the priorities in the priority management unit 64. The energy storage module 1 will then be controlled according to the operating plan BP created. The operating plan can also comprise instructions for activating the cooling module 5 and the vacuum module 4. The vacuum module is connected to the rotor housings of the flywheel energy storage units 31 via the pipe system 42 (shown in black) and generates the required operating vacuum by means of a vacuum pump stage 41 that is connected to the pipe system 42 and can, for example, comprise a booster pump and a turbomolecular pump. In order to carry out AO, ANO the localized and non-localized control and system tasks ORS, NORS in the local and non-local power supply grids LS, NS, the energy storage module 1 uses one or more measuring units 62 to measure relevant data RD in the connected power supply grids LS, NS and uses these relevant data RD as a basis for carrying out AO, ANO (shown as a dashed arrow to the module control system 6).

Figure 4:
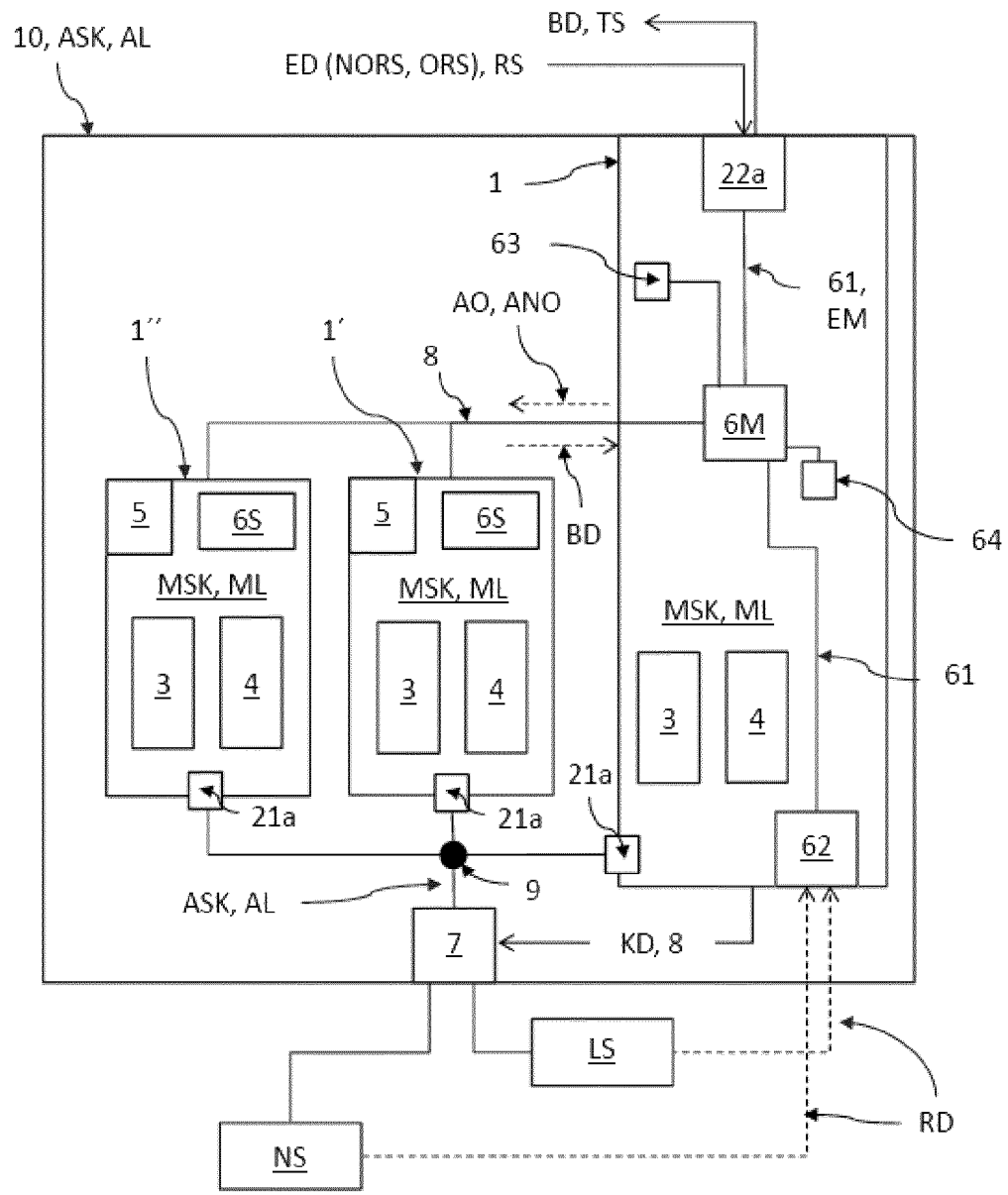
FIG. 4 is a schematic representation of an energy storage system according to the invention.

FIG. 4 shows an exemplary embodiment of the energy storage system 10 according to the invention. In this embodiment, the energy storage system 10 has three energy storage modules 1, 1', 1" each having a flywheel module 3 for reversible storage of energy per energy storage module 1, 1', 1" each having a module storage capacity MSK and a module output ML. The three energy storage modules 1, 1', 1" are subdivided into a master module with a master control system 6M for controlling the energy storage system 10 and two slave control system 6S in the energy storage modules 1', 1". The embodiment shown here is only exemplary. The number of energy storage modules per energy storage system 10 depends on the particular application desired and can therefore vary strongly. In the illustrated instance, the energy storage modules 1, 1', 1" are connected via a common connection point 9, with the result that their module capacities MSK and module outputs ML are available in total as the system storage capacity ASK and system output AL of the energy storage system 10 for control and system tasks NORS, ORS. The energy storage modules 1, 1', 1" are connected to each other via a data network 8, for example, a data bus 8. Therein, this data network 8 can be extended in order that additional energy storage modules 1''' can be added to the existing three energy storage modules 1, 1', 1" at a later point if necessary. The same applies to the power connection 21a at the common connection point 9. The energy storage modules comprise one or more power connections 21a, 21b, 21c (the latter two are not shown in the illustrated instance) which, in this embodiment, are connected via a common connection point 9 for connection to the power supply grids LS, NS. Via the connection point, the non-localized control and system tasks NORS in the non-local power supply grid NS and the localized control and system tasks ORS in the local power supply grid LS can be carried out by energy absorption En from and energy release Ep to the connected power supply grid(s) LS, NS. To split the energy flow EF into separate energy flows EFg, EFl to the separate power supply grids NS, LS at the connection point, the energy storage system 10 comprises a regulating unit 7 (see also FIG. 5). As a result, the complete system storage capacity ASK and the system output AL can be used for energy absorption En from and energy release Ep to one or more power supply grids NS, LS that is/are connected to the energy storage system 10. In an energy storage system 10 that is only connected to a local power supply grid LS connected to the non-local power supply grid NS, the regulating unit 7 comprises at least one circuit breaker. In this case, it is not necessary to split the energy flows EF because the complete energy flow EF ends in the local power supply grid LS. The master control system 6M is designed for overall control of all of the energy storage modules 1, 1', 1" connected to the data network 8 and comprises at least one data interface 22a for receiving EM external data ED (control commands) regarding the localized and non-localized control and system tasks ORS, NORS to be carried out. In order to carry out AO, ANO the control and system tasks ORS, NORS, the master control system 6M has the module storage capacities MSK and module outputs ML of all of the energy storage modules 1, 1', 1" connected to it and, therein, carries out ANO the non-localized control and system tasks NORS only within the scope of the portions of the system storage capacities ASK and/or system output AL that are not required for the localized control and system tasks ORS. The components of the master control system 6M can be seen in detail in FIG. 3. In this embodiment, the other energy storage modules 1', 1" (also referred to as slave modules) each comprise one slave control system 6S that monitors and controls the operating states BZ of the respective slave module 1', 1" and transmits to the master control system 6M the operating data BD of the slave modules 1', 1" via the data network 8. Here, the slave modules 1', 1" are jointly controlled by the master control system 6M by the latter instructing the slave control units 6S to carry out the control and system tasks ORS, NORS and the individual slave control units 6S implementing the instructions into corresponding machine parameters for the flywheel energy storage units 31. The control is effected in that the master control system 6M tells the individual energy storage modules 1, 1', 1" how much energy should be released from the flywheel energy storage units 31 by means of deceleration or be absorbed in the individual flywheel energy storage units 31 by means of acceleration. In order to ensure that this energy absorption or release can be achieved as desired, the slave control units 6S thereupon control the drive motors of the flywheel energy storage units 31 such that they decelerate or accelerate the individual flywheel energy storage units 31.

Figure 5:
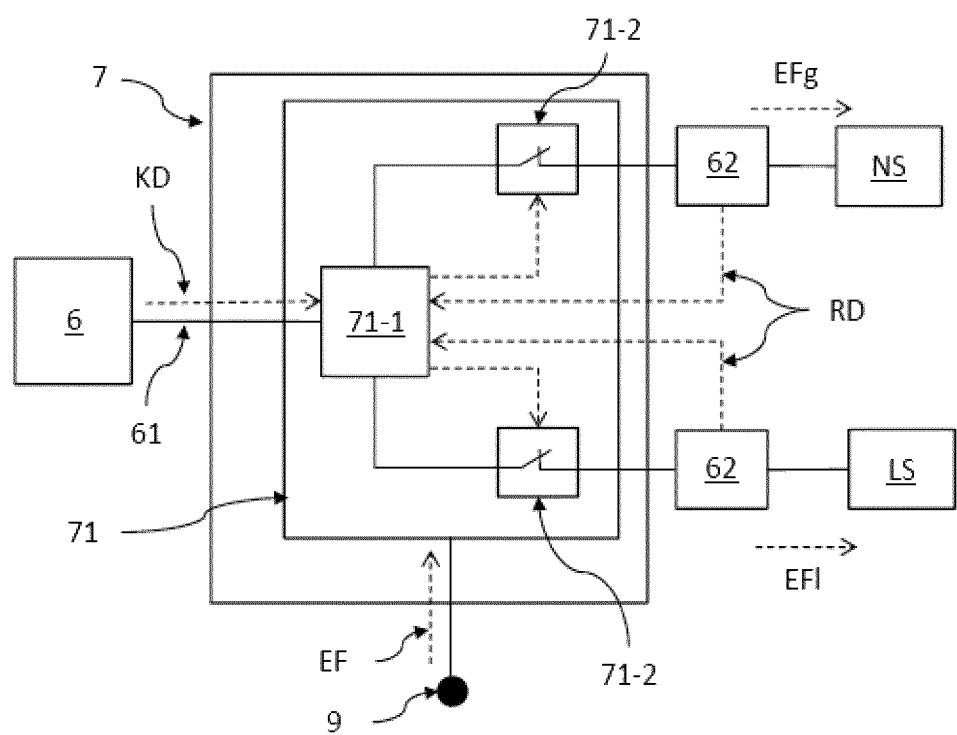
FIG. 5 shows an embodiment of the regulating unit with regulating box.

FIG. 5 shows an exemplary embodiment of the regulating unit 7 which, in the illustrated instance, is connected to a local power supply grid LS and to a non-local power supply grid NS. In order that the regulating unit 7 can regulate the energy flow EF between the connected power supply grids LS, NS and the energy storage module 1 or the energy storage system 10 and, if necessary, disconnect one or more connected power supply grids, i.e. the local power supply grid LS and/or the non-local power supply grid NS in the illustrated instance, from the energy storage module 1 or the local energy storage system 10, the regulating unit 7 according to this embodiment comprises a regulating box 71 having a control element 71-1 and separate circuit breakers 71-2 for each of the connected power supply grids LS, NS. The master control unit 6 (master control system 6M) is connected to the control element 71-1 of the regulating box 71 via a data connection 61 (or a data network 8) and transmits appropriate configuration data of the regulating function KD to the regulating box 71, i.e. directly to the control box 71-1 in the illustrated instance, for controlling the energy flows. Based on the configuration data of the regulating function KD, the control element 71-1 controls the splitting of the energy flow EF coming in from the connection point 9 to the connected power supply grids LS, NS into the energy flow EFl for the local power supply grid LS and the energy flow EFg for the non-local power supply grid NS. In this exemplary embodiment, the distribution of the energy flow EF is shown when energy is fed into both connected power supply grids LS, NS by way of example only. Similarly, the regulating box 71 is configured to control an energy flow from one of the connected power supply grids LS, NS and an energy flow to the other one of the connected power supply grids LS, NS wherein, depending on the size of the two energy flows, either the negative energy excess of the energy storage module 1 or the energy storage system 10 is stored or the positive energy excess of the energy storage module 1 or the energy storage system 10 is provided. In the illustrated instance, the energy storage module 1 or the energy storage system 10 is not shown explicitly but only symbolically through the corresponding components 6, 6M, 61, 62, 7, 8. The regulating box 71 simultaneously receives the relevant data RD of the two connected power supply grids LS, NS from corresponding measuring units 62 wherein, based on said relevant data RD, the control element 71-1 derives the presence of the two connected power supply grids LS, NS by means of criteria or threshold values for the relevant data RD that are filed in the control element 71-1. If one or either of the connected power supply grids LS, NS is no longer available because of a grid failure, the failure of the particular power supply grid LS, NS manifests itself in the corresponding relevant data RD transmitted to the control element 71-1, whereupon the control element 71-1 automatically sends appropriate disconnection instructions (dashed arrow) to the respective circuit breaker(s) 72-2 for disconnection of the energy storage system 10 from the connected power supply grid(s) LS, NS, whereupon the circuit breaker(s) 71-2 disconnect(s) the previously connected power supply grid(s) LS, NS from the energy storage module 1 or the energy storage system 10. Therein, the connected power supply grid is disconnected within a few milliseconds. If only one power supply grid LS or NS is disconnected, the energy storage module 1 or the energy storage system 10 continues to be ready for the other still connected power supply grids. As a result, a short-circuit or overload situation can effectively be prevented in the event of a failure of the power supply grid LS or NS. The exemplary embodiment shown here with a connected local power supply grid LS and a connected non-local power supply grid NS is only an example for two connected power supply grids. In other embodiments, the regulating unit 7, more particularly the regulating box 71, can also be connected to more than two power supply grids. The two or more connected power supply grids can also each be local power supply grids out of which at least one of the local power supply grids is connected to the non-local power supply grid for carrying out the non-localized control and system tasks.

Figure 6:
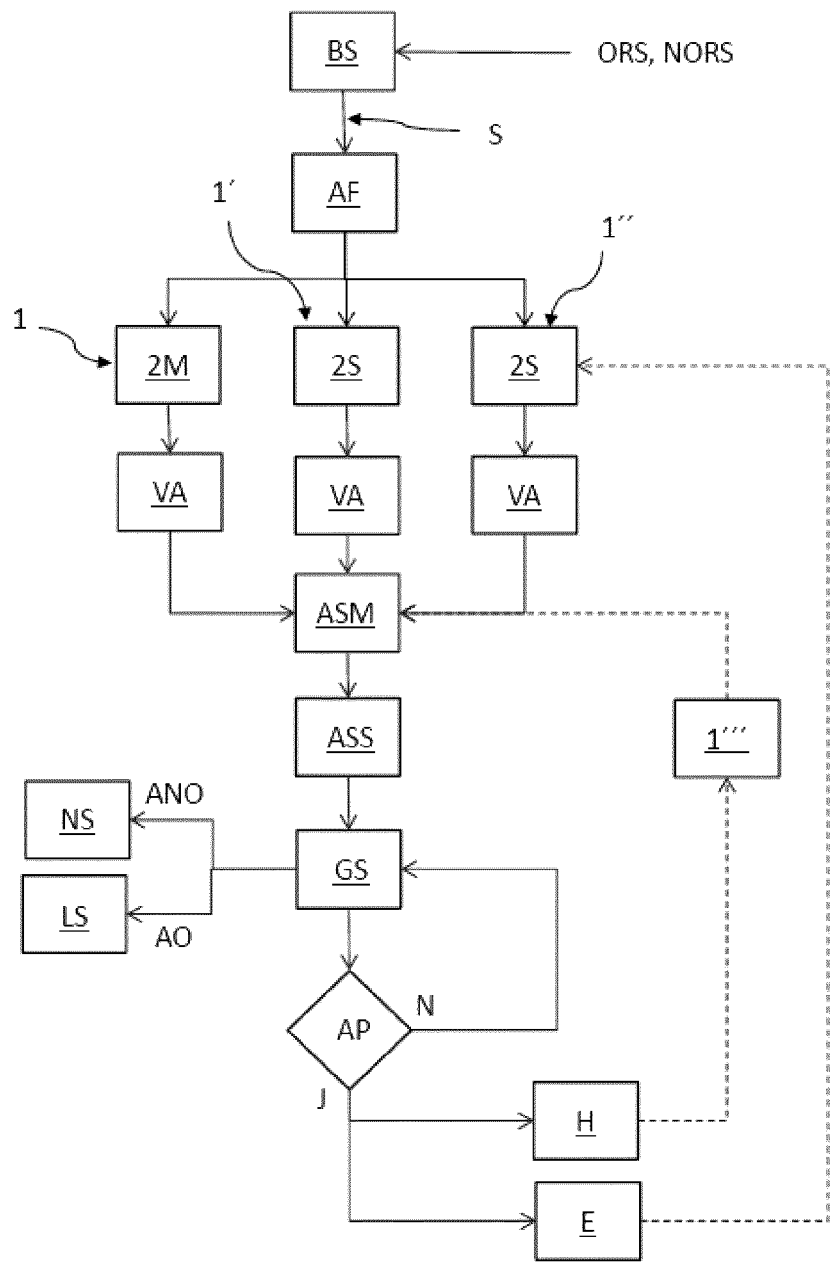
FIG. 6 shows an embodiment of the method according to the invention for providing localized and non-localized energies for control and system tasks in a variable manner.

FIG. 6 shows an embodiment of the method according to the invention for providing localized and non-localized energies for control and system tasks ORS, NORS in a variable manner. At first, the system storage capacity ASK and system output AL required for carrying out AO, ANO the desired control and system tasks ORS, NORS are determined BS in the particular power supply grids LS, NS to be connected. Thereafter, an appropriate number of energy storage modules 1, 1', 1" according to the invention having respective module storage capacities MSK, module outputs ML and module control systems 6 are set up AF at an installation site, wherein the number of energy storage modules 1, 1', 1" is selected such that the sum total of all module storage capacities MSK and module outputs ML corresponds to the required system storage capacity ASK and system output AL. Prior to operation, the module housings 2 of the energy storage modules 1, 1', 1" are anchored VA to the ground B of the installation site in order that they can absorb the static and dynamic loads during operation of the energy storage system 10. Furthermore, the energy storage modules 1, 1', 1" are connected ASM in a common connection point 9 and the connection point 9 is connected ASS to the respective power supply grids LS, NS. Likewise, the energy storage modules 1, 1', 1" are connected VB to each other by means of a common data network 8 to form a common energy storage system 10, with the result that this allows common control GS of the energy storage system via the respective module control systems 6. If the demand for carrying out control and system tasks in the connected power supply grids LS, NS changes in the course of time, the energy storage system 10 can be adjusted AP to the changed demand for system storage capacity ASK and system output AL in an appropriate manner by adding H further energy storage modules 1''' according to the aforementioned method steps or by removing E one or more energy storage modules 1" from the energy storage system 10 after all power connections 21a, 21b, 21c for the particular energy storage module 1" to be removed have been disconnected from the connection point 9, all data interfaces 22a, 22b, 22c have been disconnected from the data network 8 and the module housing 2 has been detached from the installation site.

The embodiments shown here represent only examples of the present invention and may therefore not be understood to be limiting. Alternative embodiments that can be contemplated by the person skilled in the art are likewise included in the scope of the present invention.

LIST OF REFERENCE SYMBOLS

1 Energy storage module according to the invention
1', 1", 1''' Further energy storage modules according to the invention
10 Energy storage system having more than one energy storage modules according to the invention 2 Module housing
2U Bottom side of the module housing
2S Side surface of the module housing
2O Top sides of the module housing
21a, 21b, 21c Power connection interface
22a, 22b, 22c Data interfaces
23 Insulation layer
24 Ground fixing means
3 Flywheel module
31 Flywheel energy storage unit
32 DC link
33 (Mounting) frame for the flywheel energy storage units
34 Power converter or forward converter
4 Vacuum module
41 Vacuum pump stage
42 Pipe system
5 Cooling module
6 Module control system
6M Master control system (leading module control system)
6S Slave control system (dependent module control system)
61 Data bus (in the energy storage module or between different energy storage modules)
62 Measuring unit
63 Task memory
64 Priority management unit
7 Regulating unit (in the energy storage module or in the energy storage system outside the energy storage modules)
71 Regulating box
71-1 Control element
71-2 Circuit breaker
8 Data network for connecting different energy storage modules according to the invention
9 Connection point
AF Setting up a number of energy storage modules at installation sites
AL System output of the energy storage system
ANO Carrying out the non-localized control and system tasks
AO Carrying out the localized control and system tasks
AP Adjusting the energy storage system to a changed demand for system storage capacity and system output
ASK System storage capacity of the energy storage system
ASM Connecting the energy storage modules to a common connection point
ASS Connecting the connection point to the power supply grids
B Ground, foundation
BD Operating data
BP Operating plan
BS Determining the required system storage capacity and system output
E Removing an energy storage module from an energy storage system
ED External data (control commands)
EF Energy flow
EFg Energy flow portion for the non-local power supply grid
EFl Energy flow portion for the local power supply grid
EM Receiving data (external data)
En Absorption of energy from the power supply grid (negative energy)
Ep Release of energy to the power supply grid (positive energy)
GS Common control of the energy storage system
H Adding energy storage module(s) to the energy storage system
KD Configuration data of the regulating function
LS Local power supply grid
ML Module output
MSK Module storage capacity
NORS Non-localized control and system tasks
NS Non-local power supply grid
ORS Localized control and system tasks
RD Relevant data
RS Return signal
TS Test signal
VA Anchoring the module housing to the ground at the installation site
VB Connecting the energy storage module by means of a common data network

The invention claimed is:

1. A mobile energy storage module with an enclosing module comprising at least one power connection interface and at least one data interface, wherein the energy storage module in a module housing additionally comprises a flywheel module having a plurality of flywheel energy storage units which are connected to the at least one power connection interface via a DC link to provide a common module storage capacity and module output, a vacuum module for generating a minimum vacuum in the respective flywheel energy storage units required for operating the flywheel module, and a module control system that is configured to appropriately control the modules in the module housing, such as at least the flywheel module and the vacuum module, wherein the module housing is configured in a suitable manner to ensure safe transport of the modules disposed therein and absorb static and dynamic loads of the flywheel energy storage units during operation, wherein the flywheel module comprises a common frame carrying bearings of the flywheel energy storage units and being configured to allow a pre-mounting of the flywheel energy storage units to the frame outside the module housing such that the flywheel module as a whole can be inserted into and removed from the module housing.

2. The energy storage module according to claim 1, characterized in that the module housing is designed in a windproof and watertight manner at least on all sides and has an insulation layer on all sides that is adapted to maintain a controlled indoor temperature in the module housing, the insulation layer being arranged on the module housing inside or in the module housing.

3. The energy storage module according to claim 1, characterized in that the module housing is a standardized container.

4. The energy storage module according to claim 2, characterized in that the module housing comprises on a bottom side or on one or more of its side surfaces ground fixing means for safe reversible anchorage of the energy storage module to the ground.

5. The energy storage module according to claim 1, characterized in that the flywheel energy storage units are mounted to the frame of the flywheel module such that the mechanical energy of an individual flywheel energy storage unit can be discharged into anchorages through structural components disposed in the frame in the event of an extraordinary failure such that neighboring flywheel energy storage units cannot be affected during operation and the energy storage module is secured by the ground.

6. The energy storage module according to claim 1, characterized in that the DC link is configured as a common DC bus that is connected to a power converter or forward converter.

7. The energy storage module according to claim 1, characterized in that the number of flywheel energy storage units is adapted to provide a module storage capacity for the energy storage module which at least suffices to be able to release current into a non-local power supply grid within a time period of more than 30 s.

8. The energy storage module according to claim 1, characterized in that the vacuum module comprises a common vacuum pump stage for generating an operating vacuum and a pipe system to which the flywheel energy storage units are connected.

9. The energy storage module according to claim 1, characterized in that the energy storage module furthermore comprises a heating or cooling module for removing at least internal thermal loads or for conditioning the air during operation of the flywheel module.

10. The energy storage module according to claim 1, characterized in that the module control system is provided to carry out localized control and system tasks in one or more connected local power supply grids and non-localized control and system tasks in a connected non localized power supply grid and, to achieve this, instructs at least the storage module to absorb or release energy via the one or more power connection interfaces and distributes a corresponding energy flow to the local and non-local power supply grids by means of a regulating unit in an appropriate manner.

11. An energy storage system having more than one energy storage modules each with an enclosing module comprising at least one power connection interface and at least one data interface, wherein the energy storage module in a module housing additionally comprises a flywheel module having a plurality of flywheel energy storage units which are connected to the at least one power connection interface via a DC link to provide a common module storage capacity and module output, a vacuum module for generating a minimum vacuum in the respective flywheel energy storage units required for operating the flywheel module, and a module control system that is configured to appropriately control the modules in the module housing, such as at least the flywheel module and the vacuum module, wherein the module housing is configured in a suitable manner to ensure safe transport of the modules disposed therein and absorb static and dynamic loads of the flywheel energy storage units during operation, wherein the flywheel module comprises a common frame carrying bearings of the flywheel energy storage units and being configured to allow a pre-mounting of the flywheel energy storage units to the frame outside the module housing such that the flywheel module as a whole can be inserted into and removed from the module housing,
wherein the energy storage systems are connected to each other by means of a common data network at least via the data interfaces and the respective module control systems are configured for common control of the energy storage system in order to provide a common system storage capacity and system output from the sum total of all module storage capacities and module outputs in the power supply grids connected to the energy storage system.

12. The energy storage system according to claim 11, characterized in that the power connection interfaces of all energy storage modules are connected in a common connection point for connection to a non-local power supply grid and at least one local power supply grid.

13. The energy storage system according to claim 11, characterized in that one of the module control systems is provided as master control system and the other module control systems are provided as slave control systems, wherein the master module system is provided to transmit to the slave control systems via the data network instructions for controlling the flywheel energy storage units for jointly carrying out the control and system tasks to be carried out in the connected power supply grids.

14. A method for providing localized and non-localized energy for control and system tasks in a variable manner with an energy storage system having more than one energy storage modules each with an enclosing module housing comprising a flywheel module having a plurality of flywheel energy storage units mounted to a common frame, a vacuum module for generating a minimum vacuum in the respective flywheel energy storage units required for operating the flywheel module, comprising the following steps:
determining the system storage capacity and system output required for carrying out the desired control and system tasks in the particular power supply grids to be connected;
Pre-mounting the flywheel energy storage units to the frame outside the module housing carrying bearings for the flywheel energy storage units,
Inserting the flywheel module flywheel of the energy storage units mounted on the frame as a whole into the module housing;
setting up a number of the energy storage modules having respective module storage capacities, module outputs and module control systems at an installation site, wherein the number of energy storage modules is selected such that the sum total of all module storage capacities and module outputs corresponds to the required system storage capacity and system output;
anchoring the module housings of the energy storage modules to the ground at the installation site;
connecting the energy storage modules in a common connection point, connecting the connection point to the respective power supply grids and connecting the energy storage modules to each other by means of a common data network to form a common energy storage system;
jointly controlling the energy storage system via the respective module control systems.

15. The method according to claim 14, wherein defective flywheels are replaced by removing the frame from the module housing for the replacement and re-inserting the frame into the module housing after the defective flywheel storage unit has been replaced.

16. The method according to claim 14, further comprising the step of adjusting the energy storage system to a changed demand for system storage capacity and system output by adding (H) further energy storage modules by following the aforementioned method steps or by removing one or more energy storage modules from the energy storage system after all power connections for the particular energy storage module to be removed have been disconnected from the connection point, all data interfaces have been disconnected from the data network and the module housing has been detached from the installation site.

* * * * *